United States Patent
Tang et al.

(10) Patent No.: US 6,477,112 B1
(45) Date of Patent: Nov. 5, 2002

(54) METHOD FOR ENHANCING RESOLUTION OF EARTH FORMATION ELASTIC-WAVE VELOCITIES BY ISOLATING A WAVE EVENT AND MATCHING IT FOR ALL RECEIVER COMBINATIONS ON AN ACOUSTIC-ARRAY LOGGING TOOL

(75) Inventors: Xiaoming Tang, Sugar Land; Tianrun Zhang, Stafford, both of TX (US)

(73) Assignee: Baker Hughes Incorporated, Houston, TX (US)

( * ) Notice: Subject to any disclaimer, the term of this patent is extended or adjusted under 35 U.S.C. 154(b) by 67 days.

(21) Appl. No.: 09/597,022

(22) Filed: Jun. 20, 2000

(51) Int. Cl.$^7$ .................................................. G01V 1/00

(52) U.S. Cl. ......................................... 367/38; 367/33

(58) Field of Search .............................. 367/25–35, 38, 367/56, 57, 58, 69, 73, 117

(56) References Cited

U.S. PATENT DOCUMENTS

| | | | |
|---|---|---|---|
| 4,543,648 A | 9/1985 | Hsu ............................. | 367/29 |
| 5,541,890 A | 7/1996 | Tang ............................ | 367/34 |
| 5,740,124 A | 4/1998 | Chunduru et al. ............ | 367/73 |

OTHER PUBLICATIONS

X.M. Tang et al., A dispersive–wave processing technique for estimating formation shear velocity from dipole and Stoneley waveforms, Geophysics, vol. 60, No. 1, Jan.–Feb. 1995, pp. 19–28, 9 Figs.

Kai Hsu et al., Multiple–shot processing of array sonic waveforms, Geophysics, vol. 52, No. 10, Oct. 1987, pp. 1376–1390, 13 Figs., 1 Table.

*Primary Examiner*—Edward Lefkowitz
*Assistant Examiner*—Anthony Gutierrez
(74) *Attorney, Agent, or Firm*—Madan, Mossman & Sriram, P.C.

(57) ABSTRACT

Acoustic logging data are obtained using a logging tool including at least on transmitter and a plurality of receivers. A waveform matching inversion is performed to obtain formation slowness profiles at various resolutions ranging from the total length of the receiver array to the inter-array receiver spacing. Using overlapping sub-arrays of reduced aperture provides for resolution enhancement. The enhancement is achieved by minimizing the noise contamination effects by maximizing the information redundancy in waveform data. The method achieves this by isolating the wave event of interest and matching the waveform of the event for all possible receiver pairs allowed by the sub-array. The high-resolution slowness curve successfully resolves the laminated features in a geological formation. This invention is a useful tool for evaluating thin beds in laminated formations using borehole acoustic logging.

21 Claims, 5 Drawing Sheets

METHOD FOR ENHANCING RESOLUTION OF EARTH FORMATION ELASTIC-WAVE VELOCITIES BY ISOLATING A WAVE EVENT AND MATCHING IT FOR ALL RECEIVER COMBINATIONS ON AN ACOUSTIC-ARRAY LOGGING TOOL

FIELD OF THE INVENTION

This invention generally relates to a method and apparatus for measuring and processing a characteristic of subsurface earth formations penetrated by a borehole. More specifically this invention relates to a method and apparatus for measuring and processing an acoustic characteristic such as slowness of subsurface sonic waves after these waves traverse earth formations adjoining a borehole or passing through a portion of the subsurface.

BACKGROUND OF THE INVENTION

Sonic wave information is used by the oil industry to examine and evaluate the earth's subsurface in the exploration and evaluation of valuable mineral deposits. Sonic waves are generated and recorded in oil well logging. This is called sonic or acoustic logging. The sonic wave measurement taken in well boreholes is typically the formation compressional slowness (the reciprocal of velocity). However, many different acoustic wave types may be measured, for example shear waves or Stonely waves. In the uncased well borehole the compressional head wave or direct wave is the first arrival of the compressional waveforms; the compressional slowness may be derived by measuring the first time of arrival of energy at two acoustic sensors or receivers located a known distance apart. The method does not work well in the presence of noise. In boreholes with a casing or liner, the tube or casing wave also interferes with the detection of the acoustic waves associated with subsurface earth formations.

Acoustic logging is performed in order to resolve the slowness or velocity structure of subsurface earth formations. The subsurface earth formation information accuracy or resolution that is possible is directly related to both the acquisition as well as the processing of the acquired data.

After the sonic data are acquired signal processing methods are needed to estimate the acoustic slownesses of interest associated with earth formations. The acoustic slowness measured between any two receivers is always the average over the distance between them. In acoustic logging, as the receiver separation distance increases, the quality of the slowness measurement increases while the resolution between receivers decreases. This occurs as a result of the averaging of actual slowness variation between the receivers. A short receiver distance aperture provides less averaging while usually giving noisier but potentially higher resolution data.

Another factor that affects the resolution provided by acoustic logging is the wavelength of the acoustic energy measured. It has generally been thought that one cannot resolve variations in the slowness occurring over distances qualitatively much less than a wavelength. An acoustic wavelength, assuming a sound speed of 20,000 ft/s, at 10 kHz is 2 feet. It has been assumed that sonic logging methods may resolve beds on the order of a foot thick or more when the operating frequency is approximately 10 kHz. However, as a practical matter, resolution in conventional acoustic logging has been about 3.5 feet, or approximately the length of the standard receiver array.

In formation evaluation, there is often a need to quantify the acoustic and petrophysical properties of laminated thin beds for better reserve estimation and reservoir characterization of valuable subsurface mineral deposits. Standard array acoustic processing yields a slowness log that tends to smooth, or average, the actual variations over the length of the receiver array (typically 3.5 ft.), obscuring the features that are smaller than the array aperture.

Signal processing techniques have been sought to enhance the vertical resolution of acoustic slowness logs. Hsu and Chang (1987) applied a multiple-shot semblance technique to sub arrays of four receivers and achieved a measurement scale of 1.5 ft. Tang et al. (1994) applied a phase matching method to all waveform pairs across one inter-receiver spacing and achieved a measurement scale of 0.5 ft. Both techniques utilize redundant information in overlapping sub-arrays that span the same depth interval to suppress noise and to improve the vertical resolution.

The drawback in the Hsu and Chang technique is that noise may severely degrade the data output quality using the semblance technique when the number of receivers in the array is less than four. Therefore, it is difficult for this technique to achieve a measurement scale smaller than the aperture of a four-receiver array, typically 1.5 ft. The drawback of the Tang et al. technique is that the phase matching in the frequency domain requires that a high-quality wave phase spectrum be calculated. Acquiring high quality phase spectra may be problematic since examining a long temporal portion of the waveform to calculate the phase spectrum is prone to noise contamination, while examining a short temporal portion to calculate the spectrum may significantly distort the phase spectrum.

Both the Hsu and Chang and the Tang et al. work recognized that the using shorter sub-array apertures to enhance resolution is more prone to noise contamination since there is less move-out and fewer data are used. Therefore, there is less slowness information and less data redundancy. The key in obtaining a reliable, high-resolution acoustic slowness profile using short sub-arrays is to reduce noise contamination by maximizing the redundancy of information in the data.

SUMMARY OF THE INVENTION

The present invention is a method for acquiring and processing acoustic waveform data. A waveform matching inversion is performed to obtain formation slowness profiles at various resolutions ranging from the total length of the receiver array to the inter-array receiver spacing. Using overlapping sub-arrays of reduced aperture provides for resolution enhancement. The enhancement is achieved by minimizing the noise contamination effects by maximizing the information redundancy in waveform data. The method achieves this by isolating the wave event of interest and matching the waveform of the event for all possible receiver pairs allowed by the sub-array. The high-resolution slowness curve successfully resolves the laminated features in a geological formation. This invention is a useful tool for evaluating thin beds in laminated formations using borehole acoustic logging.

DETAILED DESCRIPTION OF THE PREFERRED EMBODIMENT

The present invention enhances the resolution of earth formation compressional and shear-wave slowness (or velocity) profiles measured by an array acoustic tool. The enhanced resolution scale ranges from the conventional resolution of, by way of example 3.5 ft, (the array aperture), to 0.5 ft, (the inter-array receiver spacing). The vertical resolution in time (defined as half the width of a feature) is governed by the depth sampling rate of the logging tool and the slowness measurement scale. With the standard sampling rate of two samples per foot and a minimum measurement scale of 0.5 ft., a one foot vertical resolution can be achieved. While using overlapping sub-arrays of reduced aperture is necessary for the resolution enhancement, the decrease in data redundancy and increase in noise contamination poses a problem. The present invention solves the problem. In this invention, the wave event of interest is windowed or isolated using the wave's traveltime information. Then the wave event is matched at two arbitrary receivers in the sub-array by time-shifting the wave data using a trial slowness value. Finally, the waveform matching is performed for all pairs of receivers allowed by the sub-array aperture, so as to maximize the redundancy of information in the wave data. When the waveform mismatch residue is at the minimum for all overlapping sub-arrays, one obtains the slowness with the resolution of the sub-array aperture.

Enhancing resolution of slowness estimates from an array acoustic tool is accomplished by overlapping sub-arrays across the same depth interval whose thickness is equal to the sub-array aperture. At a chosen depth of investigation, the acoustic source on the tool is activated and a recording array (typically eight to twelve receivers) records waveform data. This procedure is repeated while the tool is pulled up a distance equal to one inter-array receiver spacing (typically 0.5 ft, but this may vary). Consequently, the receiver arrays at successive source locations are overlapped. The concepts of previous workers (Hsu and Chang, 1987; Tang et al., 1994) were to use redundant information in overlapping arrays to improve both the vertical resolution and the accuracy of the formation acoustic slowness estimation. While overlapping arrays are employed in the present invention also, the present invention employs direct wave matching which is a different and much more accurate inversion than the Hsu and Chang multiple shot semblance or the Tang et al. phase matching. Additionally, the inversion of the present invention maximizes the redundant information available thereby allowing more calculations to increase accuracy, whereas the previous methods, by their nature, do not.

Figure 1:
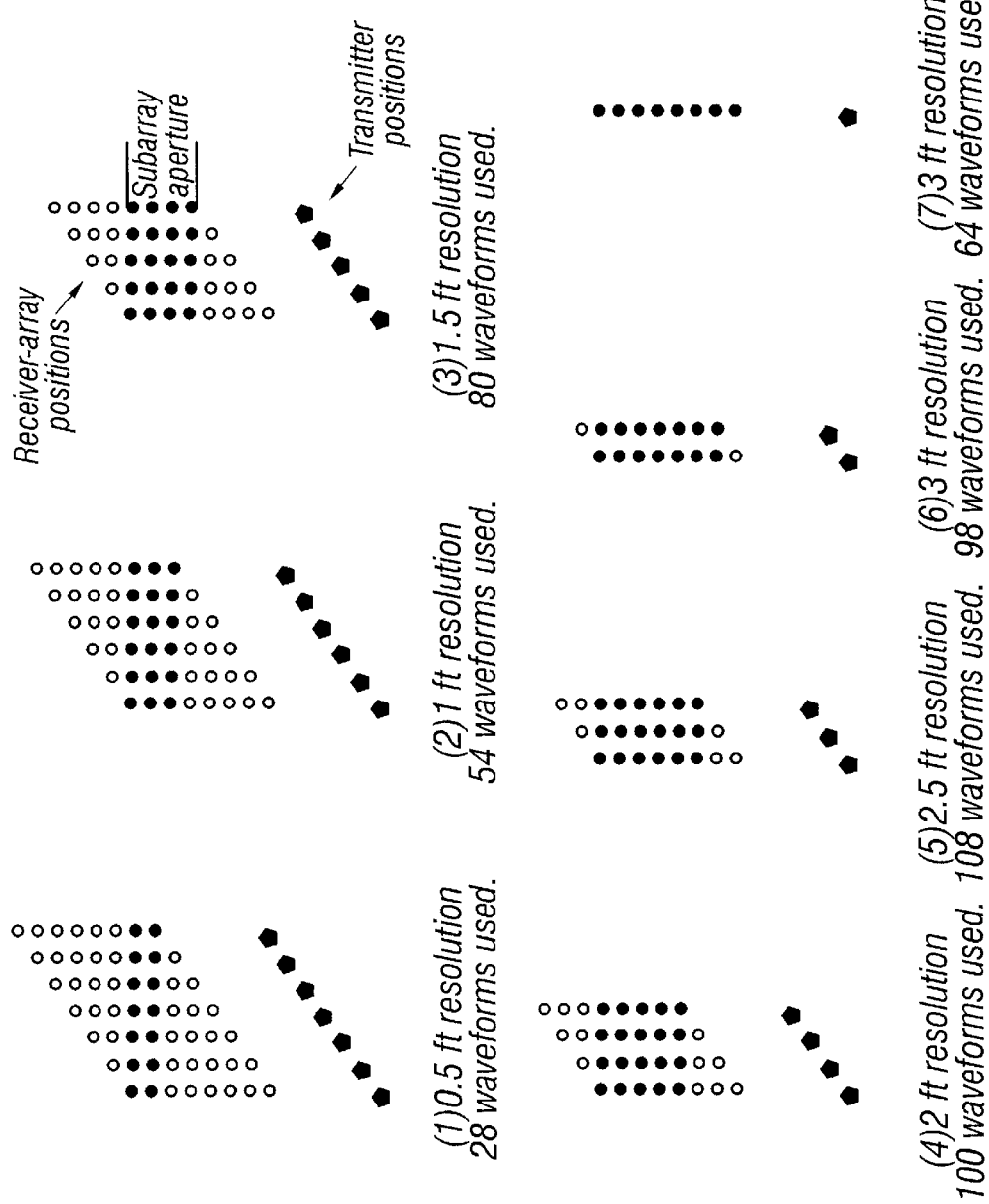
FIG. 1 Illustrates various measurement scales provided by overlapping sub-arrays of different apertures.

FIG. 1 shows all seven possible sub-array configurations for an eight-receiver array-acoustic tool. The apertures of the sub-arrays range from 3.5 to 0.5 ft. The present invention for high-resolution elastic wave slowness determination has three important aspects. The first is the use of waveform matching for determining acoustic slowness across the sub-array. For any given receiver index, n, in the sub-array, the waveform at another receiver, m, can be shifted in time to substantially match with the waveform at receiver n, as $$W_m[t+s(m-n)d] \approx W_n(t),$$

where s is the wave slowness over the sub-array aperture and d is the inter-receiver spacing. Therefore, by minimizing the difference between the above waveforms, we can formulate an inversion procedure to estimate the slowness s across the sub-array. The objective function for this estimation is a residue defined as $$E(s) = \sum_{k=1}^{K} \sum_{n=1}^{N} \sum_{m=1}^{N} \int_{T(m,n)} \{W_n^k(t) - W_m^k[t+s(m-n)]\}^2 dt \qquad (1)$$

The total number of subarrays crossing the same depth interval is K, each subarray comprising N receivers. The integration is over the time window T, in which the waveforms are matched. The placement of T depends on the locations of the receiver m and n, which will be elaborated later. For a selected value of n, the summation over m may be viewed as giving a summed measure of the error in estimating the n-th signal from the remaining signals in the subarray. For each value of k, the summation over m and n may be viewed as a mismatch residue for a particular subarray. The summation over k means that the objective function is determined for every subarray crossing the specified depth interval.

This method of slowness estimation by matching waveforms across an array is called the waveform inversion method. This method was used by Tang (1996) to estimate wave slowness across an entire receiver array in the analyses of synthesized waveforms. The advantage of this waveform inversion method over the traditional semblance method is its suitability in the present invention for small arrays. The data output quality from the semblance-based methods degrades when the number of receivers in a sub-array is less than four. In the present invention inversion, pair-wise waveform matching is performed between two receivers in the array, and works well even when the array contains only two receivers. Further, by matching each waveform in the array with all other waveforms, the signal-to-noise ratio and resultant accuracy of the inversion method is significantly enhanced over prior methods.

Figure 2:
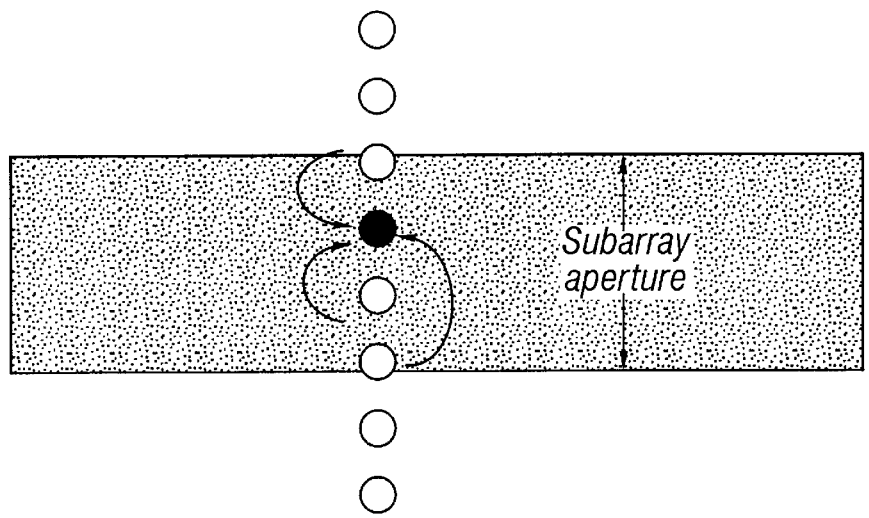
FIG. 2 Illustrates a waveform matching configuration diagram according to the present invention.

The second important aspect of the inversion method is to use all possible pair-wise receiver combinations allowed by the sub-array of N receivers, so as to maximize the redundancy of information present in the waveform data. This means that the receiver index m in the summation of equation (1) can be smaller (forward shift), or greater (reverse shift) than the index n. As shown in FIG. 2, for a four-receiver sub-array (N=4; case 3 of FIG. 1), the waveform of any receiver in the sub-array can be shifted to match with the waveform of another receiver. [Data of the third receiver in the sub-array (counting from below) are being matched in FIG. 2]. There are three data combinations for the receiver being matched. For all four receivers, there are 12 data combinations with 16 waveforms used. Further, for all five sub-arrays across the same depth interval (see case 3 of FIG. 1), there are 60 data combinations with a total of 80 of waveforms used. In contrast, for this sub-array configuration, the multiple-shot semblance technique of Hsu and Chang (1987) has only 20 waveforms used. For the extreme case of a two-receiver sub-array (N=2; case 1 of FIG. 1), the present invention has 14 data combinations for performing forward and reverse waveform shifts. The total number of waveforms used is 28. The Tang et al. (1994)

phase matching technique has only 7 data combinations or 14 waveforms used. The present invention, therefore, utilizes the maximum possible number of waveforms to maximize the redundancy of information for all sub-array configurations of FIG. 1. For the present invention, each sub-array configuration of, for example, this eight-receiver array, the number of waveforms utilized in the waveform inversion analysis is indicated in FIG. 1.

The third important aspect of the present invention is the proper selection of the time window T for each receiver in the sub-arrays. Besides the wave events of interest (e.g., compressional, shear, and Stoneley waves), the acoustic waveform data may be contaminated by various noises. These noises include road noise, reflections from subsurface bed boundaries and borehole changes, mode interference, etc. The noise effects may significantly affect slowness estimation using semblance (Hsu and Chang, 1987) or using the waveform inversion analysis [equation (1)]. For example, reflections from bed boundaries may distort the later portions of the acoustic waveform, degrading the coherence of the wave event of interest. The reflections may also attain a high degree of coherence and subsequently be erroneously picked up as the wave event of interest. Besides using all possible data combinations to suppress the noise effects, proper windowing the data for processing also effectively minimizes these effects.

Performing waveform windowing on data isolates the most coherent portion of wave events for processing. Generally speaking, the wave onset, or first arrival portion of a wave event has a high degree of coherence because of its shortest travel path from transmitter to receiver. Noise effects such as scattering or reflection from bed boundaries, mode interference, etc., will arrive later to contaminate the waveform data. In the present invention, we first obtain a wave travel (or arrival) time curve as a reference time for the wave event. This curve records the wave transit time from transmitter to receiver for each depth of data acquisition. A conventional wave slowness curve (3.5 ft aperture or other array aperture length) may also be obtained to aid the processing. The travel time curve can be obtained by tracking the first portion of the wave event across depth, or by integrating the wave slowness curve over the transmitter-to-receiver distance. The conventional slowness curve may be obtained from standard array techniques (semblance, nth-root stacking, covariance, etc.)

Figure 3:
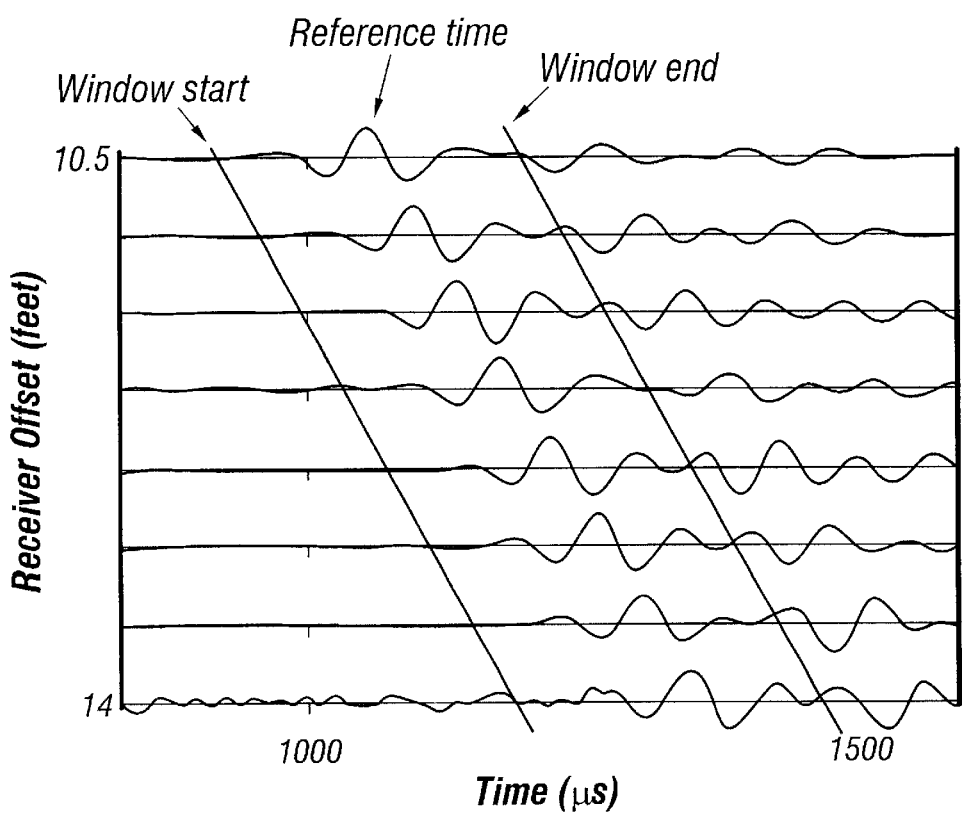
FIG. 3 Shows an example of windowing for wave event isolation.

FIG. 3 shows the placement of the time window to isolate the acoustic compressional wave event across the receiver array. The start time of the window is placed earlier in time than the earliest wave arrival. The length, or time duration, of the window is chosen to include, for example, two to three cycles of the wave event. The arrival time for the peak of the P-wave event is obtained from tracking the wave for the first receiver in array. The time difference between the window start and the predetermined reference time is calculated and recorded for later use. These steps set the time window at the first receiver and the window's position relative to the predetermined reference time. The next step is to place the window for the rest of the receivers in the array.

The wave event moves out, or propagates across the receiver array according to its slowness. The placement of the window for each subsequent receiver is along this wave moveout. The window start time at the nth receiver in the array is:

$$T_n = T_1 + (n-1)d/s_{av}, \quad (2)$$

where n is receiver index, $T_1$ is the window start time at the first receiver; d is receiver spacing; and $s_{av}$ is the average slowness across the array. We can use the predetermined slowness value for $s_{av}$ or we can simply use $T_1/trsp$ as an estimate for $s_{av}$ where trsp is transmitter-to-receiver spacing. The value of $s_{av}$ is only approximate, since a slight change of the window move-out does not significantly change the coherence of the windowed waves. This windowing scheme ensures that the most coherent first arrival portion of the wave event is always included in the processing. This windowing scheme excludes the noise effects in the later portion of the waveform data, thereby restricting noise from adversely affecting the waveform inversion.

Once the window positions for all receivers in the array are specified, equation (1) is used to estimate the wave slowness for any chosen resolution (or sub-array aperture), as shown in FIG. 1. A slowness value that minimizes the objective function in equation (1) is taken as the wave slowness for the chosen resolution. When the objective function is minimized, then measure of difference between acquired signals is minimized, and the slowness value where this minimization occurs is taken as the most accurate slowness value.

At least two types of methods can be used to minimize the objective function. The first is a local minimization method (e.g., Newton or Brent method, see Press et. al., 1989). The local method requires an initial slowness value reasonably close to the minimum. For this method, $s_{av}$ derived by any method may be used as the initial value. With the given initial value, the local method iterates to find the minimum of the objective function and determines the value of the desired slowness. The second method is called the global minimization method. This method finds the smallest of all possible minimums, called the global minimum, of the objective function when the function has more than one minimum. Chunduru and Tang (1998) describe the use of the global method for formation slowness determination from an acoustic tool. The global method tests the objective function across a predetermined range of possible values in such a manner the smallest minimum in the range will be found. Generally speaking, both methods give the same result when data quality is good. The local method is significantly faster than the global method, but the global method gives more accurate and robust results than the local method when data are poor quality or contain significant noise energy.

After determining the slowness value for a given depth, the same process is applied to the data of the next depth. The window positions for the new data are updated by the predetermined reference time and slowness curves for the corresponding depth. The first receiver window start time is now given by $$T_1 = T_{ref} + (T - T_{ref})_{prev}, \quad (3)$$

where $T_{ref}$ is the current wave reference time and $(T_1 - T_{ref})_{prev}$ is the difference between the window start time and the reference time for the previous depth. After obtaining $T_1$ for the current depth, equation (2) is used to fix the window positions at the rest of the receivers. The process is repeated until data of all depths are processed.

Figure 4:
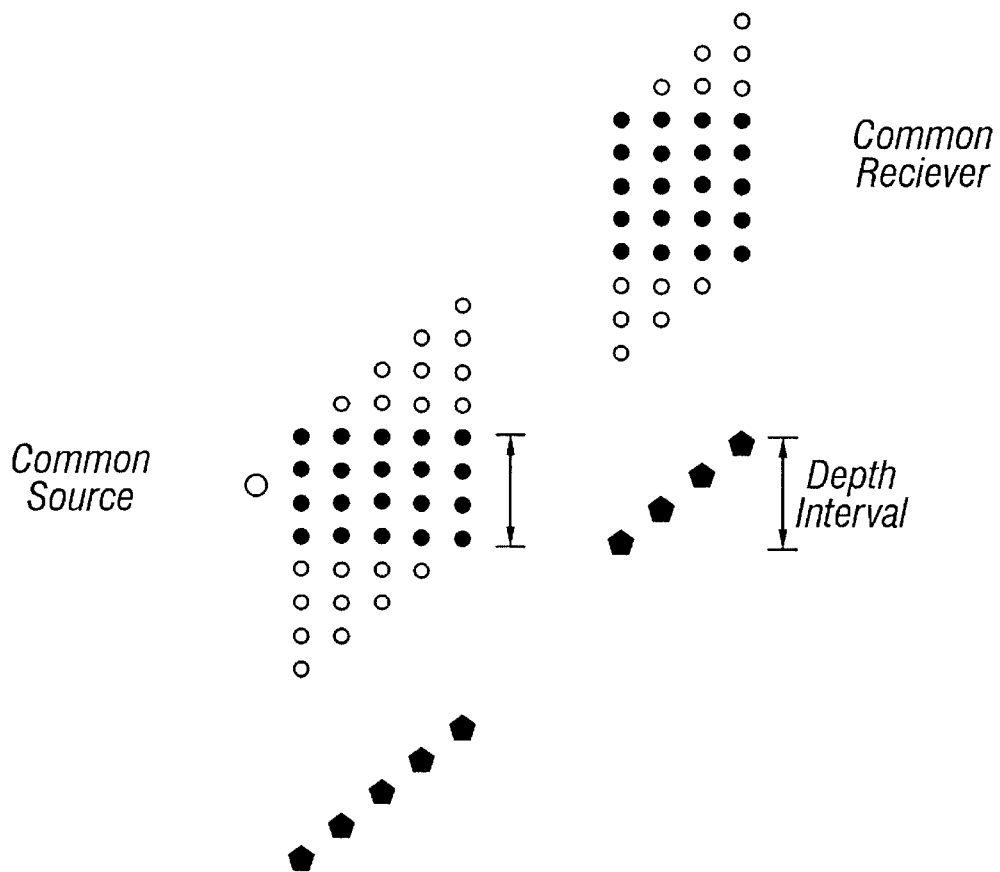
FIG. 4 Is a diagram showing data sorting of arrays of depth intervals.

The various sub-array configurations shown in FIG. 1 are formed for successive transmitter locations. They are called common-source gathers. Analogous to the common-source gathers we can form various common-receiver sub-array configurations. It is well known that combining or averaging the slowness values from common-source and common-receiver arrays can compensate the slowness value for the effects of borehole changes (e.g., cave-in). The use of the common-receiver gather can also enhance or make up for the missing estimates in the common-source configurations (Hsu and Chang, 1987). However, according to Hsu and Chang's (1987) modeling results, the common-receiver gather, compared to the common source gather, is more sensitive to tool's depth registration error. FIG. 4 shows the configuration of a four-receiver sub-array for the common-receiver gather. As the acoustic tool is pulled up during logging, successive transmitter locations eventually cross the same depth interval spanned by the common-source sub-arrays. For an array of eight receivers, there are five common-receiver sub-arrays covering the same depth interval. This construction of common-receiver sub-arrays can be made for various sub-array apertures ranging from two to seven receiver spacings, similar to the common-source configurations shown in FIG. 1. The above-described analysis can be applied to the common-receiver sub-arrays to determine the slowness value of a wave mode.

The above procedures can be applied to all the wave modes that are acquired by an array acoustic tool. Many modern array acoustic tools generate and acquire monopole and dipole waveform data. The wave modes that can be processed with the present invention include the compressional, shear, and Stoneley waves in the monopole waveform data, and the dipole-shear or flexural wave in the dipole waveform data. The method as described here is not limited to monopole and dipole waveform data, but may include quadrupole and octopole data as well.

Figure 5:
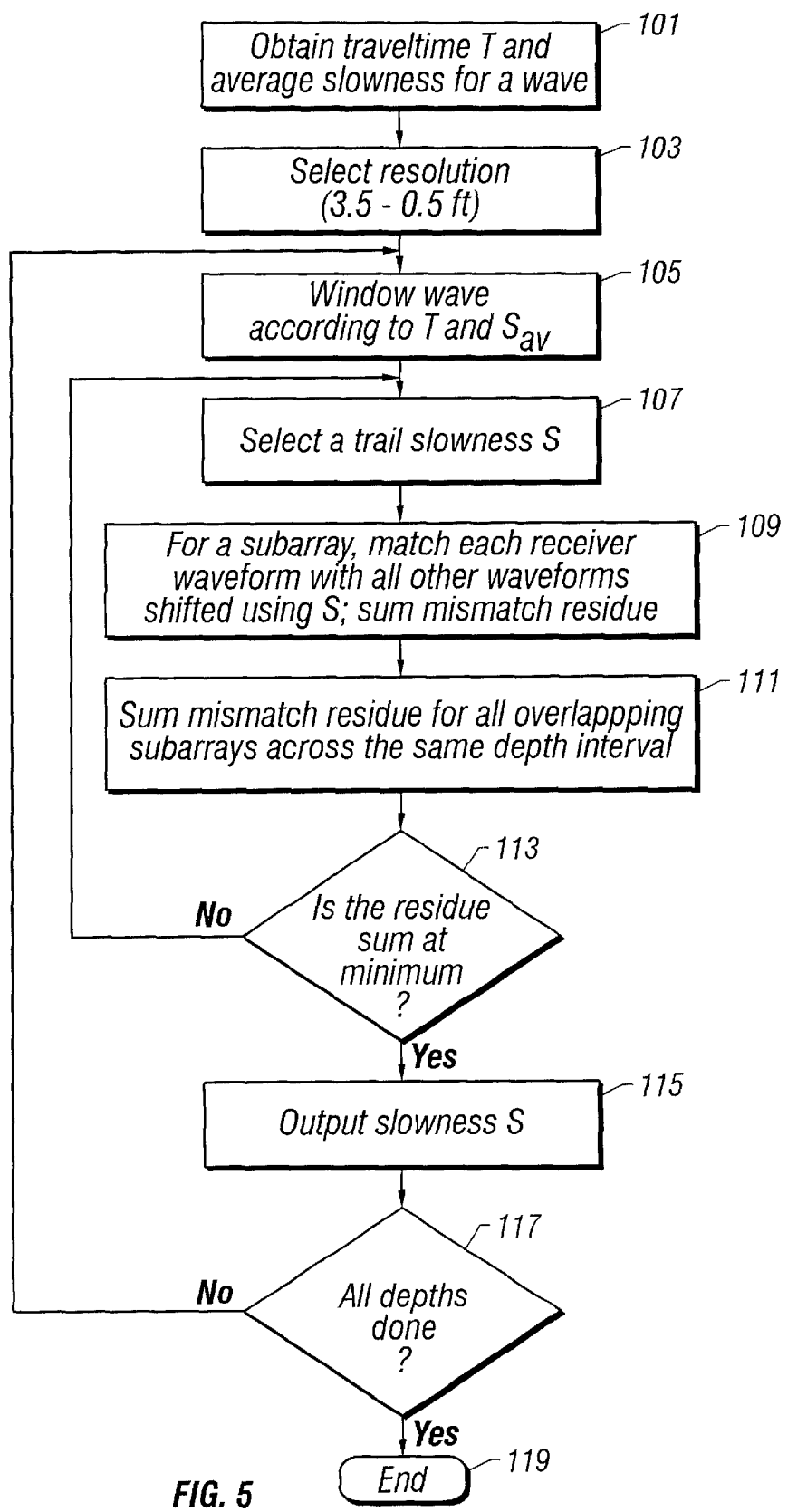
FIG. 5 Is a schematic flowchart for the preferred embodiment of the invention.

With the above elaboration about the proposed method, processing software can be implemented to perform the high-resolution slowness estimation from array acoustic waveform data. FIG. 5 illustrates the process flow for this implementation.

From acoustic logging data the traveltimes, traveltime windows (T) and average slownesses ($s_{av}$) are obtained 101. The resolution or subarray aperture is then selected, 103, which may be any length from the distance between two adjacent receivers up to the array length, or the distance between any receivers. For this example adjacent receivers are 0.5 ft apart. The data are then windowed according to $s_{av}$ and T 105. A trial slowness is then selected, 107, which may be $s_{av}$ as above. The data are then matched, 109, with all waveforms shifted using the computed slowness, leaving a mismatch residue. The mismatches are then summed, 111, for each sub-array across a depth interval. The residue is checked to see if it is at a minimum, 113. If the residue is not at a minimum the process iterates back to 107 to select another trial slowness. If the residue is determined to be a minimum, the slowness for the interval is output, 115. A check is done to determine if slowness values for all depths have been computed, 117. If more analysis is necessary, the process iterates back to 105. If all depths have been completed the process ends, 119.

After the data are processed the slowness values are stored for later use. The values may be displayed in any format, as a function of logging time or depth.

Figure 6:
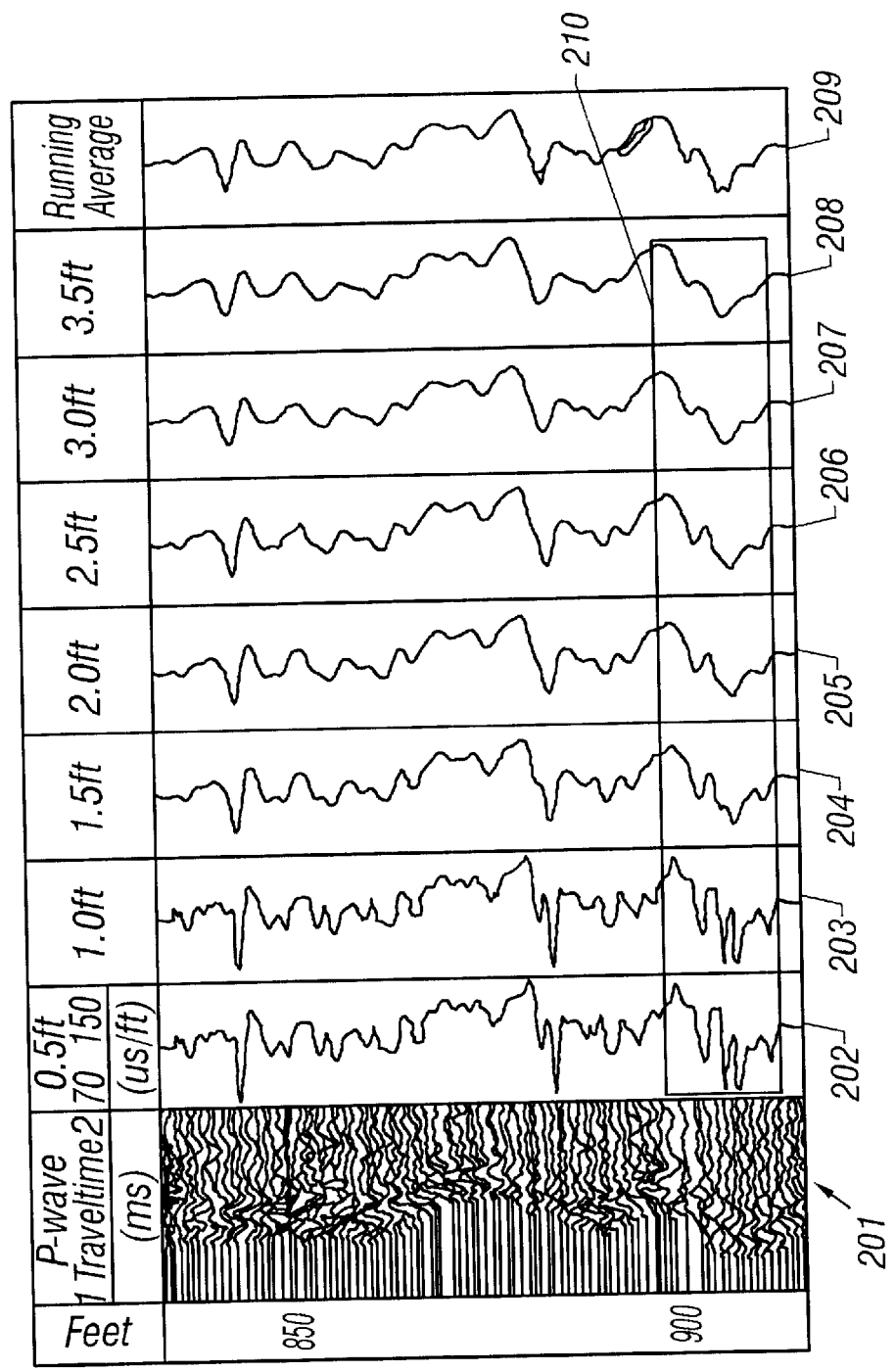
FIG. 6 Illustrates the results of the present invention at various measurement scales.

FIG. 6 demonstrates the resolution enhancement from this method. Track 201 of this FIG. 6 shows the compressional wave portion of the acoustic log data across a depth segment of 100 ft. Only data from receiver 1 of an eight-receiver array are displayed. Track 201 also shows the P-wave traveltime curve that was used to place the time window for processing. Tracks 202 through 208 show slowness logs obtained for various resolutions provided by the common-source configurations in FIG. 1. It is clear that the resolution of formation features is increasingly enhanced when the sub-array aperture decreases from 3.5 to 0.5 ft (from track 208 to 202). Features that are obscure on the conventional log (track 208, 3.5 ft aperture) are clearly identified on the log with the highest resolution (track 202, 0.5 ft aperture). For example, the 0.5 ft aperture log in track 202 reveals a laminated formation between 895 and 915 ft. (indicated by the box 210), while this lamination cannot be seen on the 3.5 ft aperture log (track 208). Track 209 provides a check of the processing results by overlaying the running average of each slowness log from track 202 to 207 with the conventional log curve (track 208). The length for the average is 3.5 ft for track 202, 3.0 ft for track 203, . . . , and 0.5 ft for track 207. The different averaging lengths are used to average the logs of different resolutions, so as to match with the resolution of the conventional slowness log (3.5 ft). The various average curves overlay with the conventional curve varying with only small differences. This comparison demonstrates that these curves of enhanced resolution are inherently consistent with one another, although the magnitude of variations may be very different on curves with different resolutions. The consistency of the curves shows that the present method can enhance the resolution of formation acoustic slowness by reducing the measurement scale, or subarray aperture from 3.5 to 0.5 ft.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of using an acoustic logging tool conveyed in a borehole in a formation for determining a characteristic of the formation, said logging tool having at least one source and a plurality of receivers the method comprising:
    (a) selecting a depth interval of investigation;
    (b) identifying a plurality of positions of the at least one source and a subset of associated receivers corresponding to said depth interval and defining a plurality of subarrays associated with said depth interval;
    (c) for each of said plurality of subarrays, defining a plurality of associated signals;
    (d) selecting an initial slowness associated with said depth interval;
    (e) for a selected one of said plurality of subarrays determining a measure of difference between the selected associated signal and an estimated value of the selected associated signal using signals other than the selected associated signal and the slowness, and summing said measures of difference to give a summed measure of difference for the selected associated signal;
    (f) repeating step (e) for at least one other of the associated signals for the subarray and summing the summed measures of difference to give a mismatch residue for the subarray;

wherein both forward and backward shifts are used in determining said estimated values for the at least one or the at least one other associated signal.

2. The method of claim 1 wherein said waveform matching further comprises:
    (g) repeating steps (e) and (f) for each of the plurality of subarrays and summing the mismatch residues for the subarrays to give a residue;
    (h) updating said slowness; and
    (i) repeating steps (d)–(h) until the residue attains a minimum.

3. The method according to claim 2 wherein the signals associated with said selected depth interval are windowed over a predetermined length in time.

4. The method according to claim 2 wherein a length of the depth interval is selected from the group consisting of:
(i) a distance between any two receivers on the tool; and
(ii) a distance between the at least one source and one of the plurality of receivers.

5. The method according to claim 2 wherein the signals associated with the selected depth intervals are windowed based on formation slowness.

6. The method according to claim 2 wherein selecting an initial slowness value further comprises using a transit time measured between any two receivers on the tool.

7. The method according to claim 2 wherein selecting an initial slowness value further comprises using a transit time measured between the at least one source and one of the plurality of receivers on the tool.

8. The method of claim 2 wherein determining the estimated value of the signal further comprises applying an initial shifting of relevant waveforms computed according to formation slowness derived by any method, said shifting selected from:
(i) an arbitrarily selected formation slowness;
(ii) an average formation slowness;
(iii) a formation slowness previously derived from another depth of investigation; and
(iv) a conventional slowness curve obtained from array techniques selected from the group consisting of semblance, nth root stacking, and covariance analysis.

9. The method of claim 2 further comprising converting said signals to a common domain of said signals sharing a common spatial attribute.

10. The method of claim 2 further comprising selecting receiver data for determining a measure difference in the signals from at least one common domain of the signals sharing a common spatial attribute.

11. The method of claim 2 further comprising repeating steps a) through i) for different depth intervals of investigation.

12. The method of claim 2 further comprising repeating steps a) through i) for different depths of investigation in the well bore.

13. The method of claim 2 further comprising forming a record of the traveltime characteristics or formation slowness values.

14. The method of claim 2 further comprising displaying traveltime characteristics as a function selected from the list consisting of i) depth and ii) time.

15. The method of claim 2 wherein updating the slowness is performed by iteratively minimizing an objective function selected from the group consisting of:
(i) a local minimization method; and
(ii) a global minimization method.

16. The method of claim 2 wherein the plurality of signals represent a wave type from the group consisting of (i) compressional waves, (ii) shear waves, and, (iii) Stoneley waves.

17. The method of claim 2 wherein the plurality of signals represent a mode selected from the group consisting of (i) monopole waves, (ii) dipole waves, (iii) quadrupole waves, and (iv) octupole waves.

18. The method of claim 2 wherein the determined characteristic is a slowness of the formation.

19. The method of claim 1 wherein plurality of subarrays are defined in one of (i) a common source gather, and, (ii) a common receiver gather.

20. The method of claim 1 wherein the plurality of subarrays are defined in a common source gather and a maximum number of waveforms used is given by $KN^2$ where K is the number of subarrays and N is the number of receivers in a subarray.

21. The method of claim 1 wherein the plurality of subarrays are defined in a common receiver gather and a maximum number of waveforms used is given by $NK^2$ where K is the number of subarrays and N is the number of sources in a subarray.

* * * * *